Figure 6:
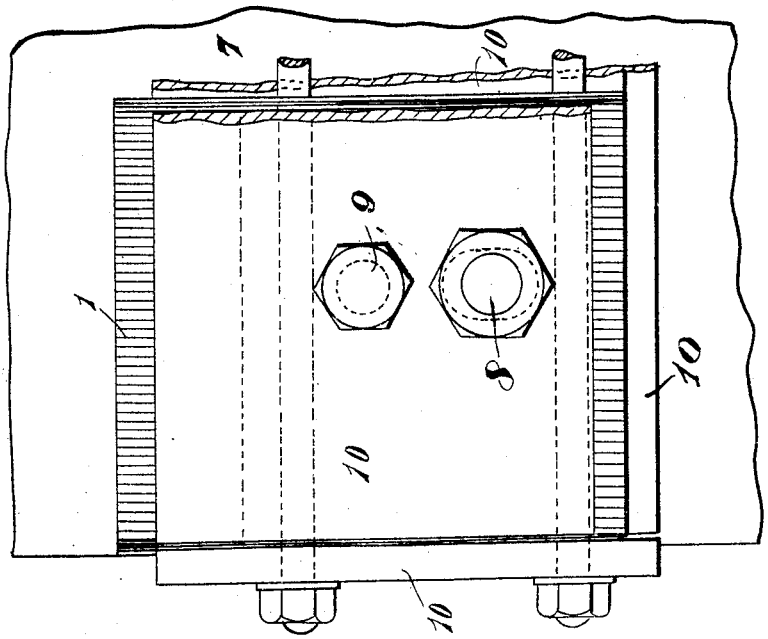

No. 638,070. Patented Nov. 28, 1899.
W. B. SAYERS.
DYNAMO ELECTRIC MACHINE.
(Application filed Sept. 28, 1898.)
(No Model.) 2 Sheets—Sheet 1.
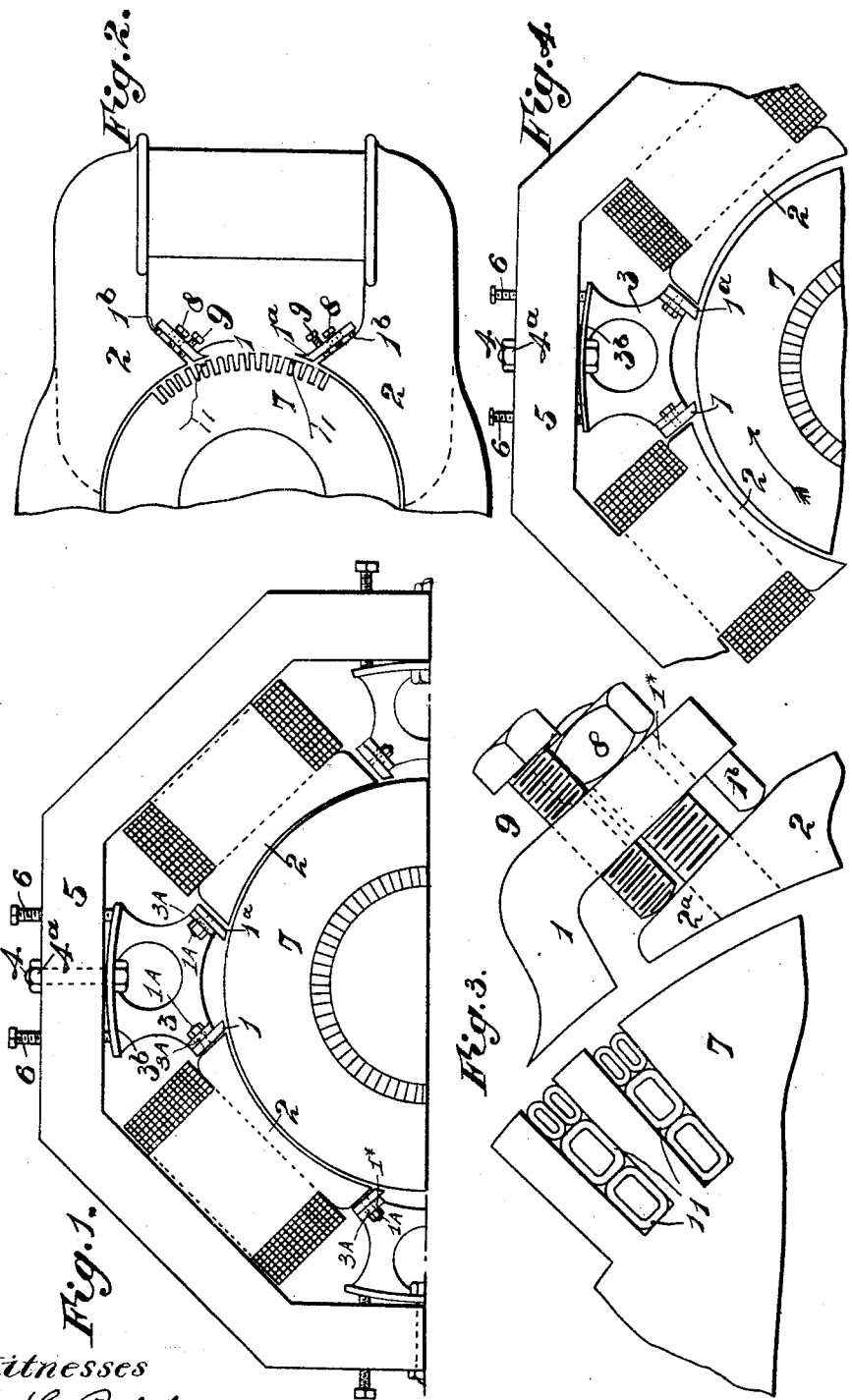
Witnesses
C. L. Belcher
Wm. H. Capel
Inventor
Wm. Brooks Sayers
By his att'y H. C. Townsend No. 638,070. Patented Nov. 28, 1899.
W. B. SAYERS.
DYNAMO ELECTRIC MACHINE.
(Application filed Sept. 28, 1898.)

(No Model.) 2 Sheets—Sheet 2.

Witnesses:
C. L. Belcher
Wm. H. Capel

Inventor
Wm. Brooks Sayers
By his att'y

UNITED STATES PATENT OFFICE.

WILLIAM BROOKS SAYERS, OF BEARSDEN, SCOTLAND, ASSIGNOR TO HIMSELF, AND THE MAVOR & COULSON, LIMITED, OF GLASGOW, SCOTLAND.

DYNAMO-ELECTRIC MACHINE.

SPECIFICATION forming part of Letters Patent No. 638,070, dated November 28, 1899.

Application filed September 28, 1898. Serial No. 692,147. (No model.)

*To all whom it may concern:*

Be it known that I, WILLIAM BROOKS SAYERS, a subject of the Queen of Great Britain and Ireland, residing at Bearsden, near Glasgow, Scotland, have invented Improvements in Dynamo-Electric Machines, of which the following is a specification.

In the specification of Letters Patent No. 607,593, granted July 19, 1898, I have described a construction of continuous-current dynamo-electric machine in which in order to obtain a fixed position of the brushes there is provided at each of two opposite sides of each pole of the field magnet or magnets a polar projection, the two such polar projections of each pole constituting a pair being arranged longitudinally in relation to the cylindrical surface of the armature, but separate therefrom and connected together magnetically, as by an iron frame, so as to form, with the armature-core, a magnetic circuit in which there will be produced when a current is flowing in the armature a magnetic flux that will be proportional to the armature-current throughout a considerable range and will be in the proper direction in the adjacent polar projections of successive pairs of polar projections to bring about by means of the commutator-coils the reversal of the currents in the armature-sections at the required times in whichever direction the armature may be running and whether as a generator or as a motor.

Now the present invention has for its object to simplify the construction and improve the working of dynamo-electric machines of the kind referred to. According thereto the reversing poles are mounted in close proximity to the field-magnet poles, but are separated therefrom by an air-gap or by solid non-magnetic material and are so arranged as to be readily adjustable both as regards the distance between each pair and the distance of the pole-faces from the armature. The arrangement is such that the reversing pole-pieces are magnetized initially by the field-magnet poles, but to a lower degree than these poles, and that the effect of the armature-current is to differentiate between the magnetization of the two reversing pole-pieces which coöperate to produce commutation on one side of the armature. Thus in the case of a generator the trailing pole-piece is strengthened and the leading pole-piece weakened or even reversed in sign by the armature-current, and in the aggregate the effect is the same as if the two reversing pole-pieces had had initially no magnetism.

Figure 5:
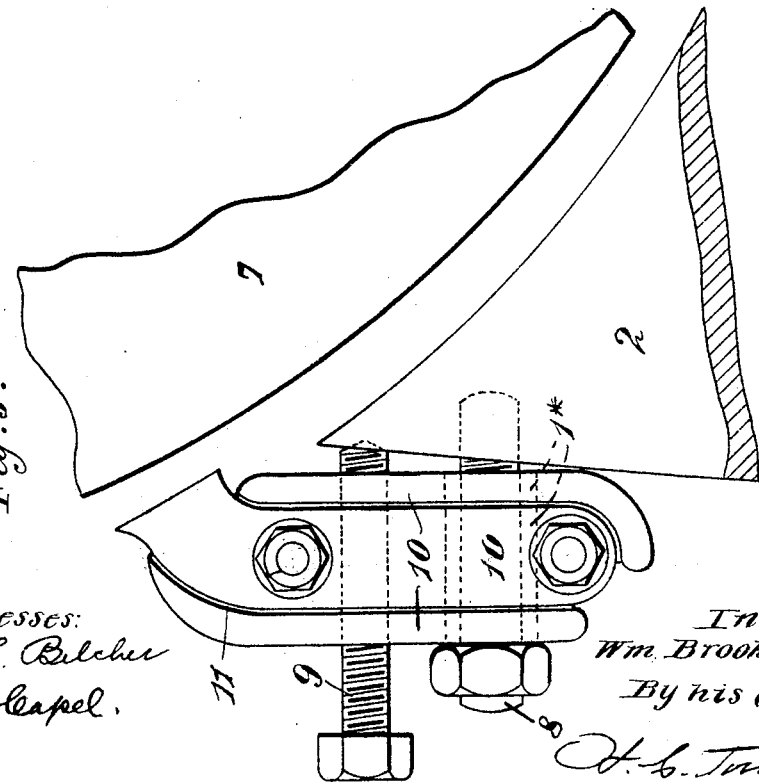

Figure 1 of the accompanying drawings shows in end elevation part of a four-pole dynamo provided with one arrangement of reversing pole-pieces according to this invention. Fig. 2 shows in end elevation part of a two-pole dynamo with a modified arrangement of reversing pole-pieces. Fig. 3 shows in end elevation and to a larger scale a further modified arrangement of reversing pole. Fig. 4 is a similar view to Fig. 1, but showing a modified form of the field-magnet pole. Figs. 5 and 6 are elevations at right angles to each other, showing a further modified construction of reversing pole.

In the arrangement shown in Fig. 1, which is suitable for multipolar machines, the two reversing pole-pieces 1 and $1^a$, arranged between and in proximity to adjacent field-magnet poles 2, are adjustably mounted on and secured by means of bolts $1^A$ to a carrier of non-magnetic material that comprises end plates 3, connected by longitudinal inner members $3^A$, to which the reversing pole-pieces 1 $1^a$ are secured, and a thin outer strip or member $3^b$, that is secured at its center by a bolt 4 to the yoke-piece 5 and is acted upon by adjustable set-screws 6, the arrangement being such that by adjusting the position of the nut $4^a$ on the bolt 4 and the position of the set-screws 6 the distance of the reversing pole-pieces 1 $1^a$ from the field-magnet poles 2 and armature 7 can be adjusted to suit requirement.

In the modified arrangement shown in Fig. 2, which is suitable for two-pole machines, each reversing pole-piece 1 is provided with distance-pieces $1^b$, of which only one can be seen in the end view, and is secured to but at a short distance from one side or end of the corresponding field-magnet pole 2 by a screw 8, the said reversing pole-piece being provided with an adjusting-screw 9, by means of which its position relatively to the said field-magnet pole and armature can be adjusted. Such pole-pieces may in some cases be each secured upon an extension 2ª of the field-magnet pole 2, as shown in Fig. 3, and be each made approximately of L shape in end view, as represented.

In some cases—as, for instance, in large machines and when it is desired to obtain the minimum of heating and the minimum of objectionable noise—the air-gap between armature-surface and field-magnet face may, as shown in Fig. 4, be made to gradually increase in radial width toward the pole edge, which is strengthened by the armature reaction, and then in order to obtain a sufficiently-rapid gradient in the reversing field to act satisfactorily on the commutator-coils the reversing pole may be fixed comparatively close to the armature, as shown. I may also when necessary and in order to reduce eddy-currents and avoid noise make the reversing pole-pieces of laminated iron, the plane of lamination coinciding with that in the armature-core. Figs. 5 and 6 show a reversing pole-piece 1 built up of laminated iron plate clamped between end and side plates 10, with interposed insulating material 11, the whole being secured to the end of the field-magnet pole 2 by nuts and bolts 8 passing through slots 1 in the pole-piece and plates, and adjusted in position by set-screws 9, as in the arrangements shown in Figs. 2 and 3, the said slots 1 allowing of adjustment of the pole-piece toward the slotted armature 7. The clamping-plates 10 may be of iron, and the inner one may rest at its outer end against the field-magnet pole 2, as shown, so as to be in direct magnetic contact therewith, as also may the pole-pieces shown in Figs. 2 and 3 if the distance-pieces 1ᵇ be of iron. In each case the distance apart of each pair of reversing pole-pieces 1 1ª, measured around the armature, is made approximately equal to the distance apart of the sides of each of the commutator-coils 11, Fig. 2, with which the armature is provided according to my prior specification, the object of each of the arrangements, as with the arrangement described in my said prior specification, No. 607,593, being to enable the brushes to be fixed in a sparkless position for varying load.

I am aware that it has heretofore been proposed to obtain a fixed position of the brushes with armatures wound in accordance with my prior specifications, No. 516,553, granted March 13, 1894, and No. 524,119, granted August 7, 1894, by adjusting the gap between the trailing and leading pole-tips with reference to the commutator-coils to the same relationship as that described for reversing poles in my said prior specification, No. 607,553; but the arrangement of the pole-pieces according to the present invention has the advantage that the magnetization of the armature-teeth under the trailing-pole edge will be changed less rapidly than is the case when the edge of the field-magnet pole itself is used, the result being that the heating due to eddy-currents and hysteresis is much less with my present arrangement than with former arrangements.

What I claim is—

1. In a dynamo-electric machine, the combination with an armature and a field-magnet having two or more poles, of pairs of reversing pole-pieces arranged between the field-magnet poles and in proximity thereto so as to be magnetized initially thereby, the pole-pieces of each pair being magnetically disconnected from each other.

2. In a dynamo-electric machine, the combination with an armature and a field-magnet having two or more poles, of pairs of reversing pole-pieces arranged between the field-magnet poles and in proximity thereto so as to be magnetized initially thereby, the reversing poles of each pair being magnetically disconnected from each other and adjustable relatively to said field-magnet poles and armature.

3. A dynamo-electric machine having an armature provided with commutator-coils, and a field-magnet each pole of which is provided at each side with an independent adjustable reversing pole-piece adapted to form an extension of the field-magnet pole but separated therefrom at its inner end or side next the armature.

4. In a dynamo-electric machine, the combination with an armature having commutator-coils of a field-magnet provided on each side with adjustable magnetic extensions adapted to act as reversing pole-pieces, substantially as described.

5. In a dynamo-electric machine having an armature provided with commutator-coils, the combination with the armature and field-magnet poles, of independent reversing pole-pieces mounted on opposite sides of each field-magnet pole so as to be capable of adjustment to and from such pole and the armature, the distance apart of the reversing poles between adjacent field-magnet poles being approximately equal to the distance apart of the sides of each commutator-coil, substantially as described.

6. In a dynamo-electric machine, the combination with an armature provided with commutator-coils, of a field-magnet the faces of whose poles are eccentric to the armature-surface, and reversing pole-pieces arranged in proximity to the two sides of each field-magnet pole, substantially as described.

7. In a dynamo-electric machine, the combination with a field-magnet and an armature provided with commutator-coils, of reversing pole-pieces made of laminated iron and arranged in proximity to opposite sides of each field-magnet pole so as to be magnetized initially thereby but to a lower degree than such pole, substantially as described.

8. In a dynamo-electric machine, the combination with a field-magnet and an armature provided with commutator-coils, of reversing pole-pieces arranged in proximity to opposite sides of each field-magnet pole, screws by which said reversing pole-pieces are attached to said field-magnet poles, and adjusting-screws by which the distance of the inner ends of said pole-pieces next said armature from the field-magnet poles can be adjusted, substantially as described.

9. In a dynamo-electric machine, the combination with a field-magnet and an armature provided with commutator-coils as set forth, of reversing pole-pieces mounted on opposite sides of each field-magnet pole so as to bear against the same at their outer ends but separated therefrom at their inner ends next the armature, the distance apart of each pair of pole-pieces between adjacent field-magnet poles being approximately equal to that between the sides of each commutator-coil, substantially as described.

Signed at Glasgow, Scotland, this 16th day of September, 1898.

WILLIAM BROOKS SAYERS.

Witnesses:
 CHAS. FINLAYSON,
 JOHN R. JOHNSTON.